United States Patent
Mitran et al.

(10) Patent No.: US 7,930,686 B2
(45) Date of Patent: *Apr. 19, 2011

(54) DEFINING MEMORY INDIFFERENT TRACE HANDLES

(75) Inventors: Marcel Mitran, Markham (CA); Ali L. Sheikh, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 101 days.

This patent is subject to a terminal disclaimer.

(21) Appl. No.: 12/487,906

(22) Filed: Jun. 19, 2009

(65) Prior Publication Data
US 2009/0259831 A1    Oct. 15, 2009

Related U.S. Application Data

(63) Continuation of application No. 11/625,898, filed on Jan. 23, 2007, now Pat. No. 7,617,493.

(51) Int. Cl.
*G06F 9/45* (2006.01)
*G06F 9/455* (2006.01)

(52) U.S. Cl. ............. 717/148; 703/23; 703/27; 717/159

(58) Field of Classification Search .................. 717/138, 717/139, 148, 159, 162; 703/23, 27
See application file for complete search history.

(56) References Cited

U.S. PATENT DOCUMENTS

| | | |
|---|---|---|
| 2003/0093649 A1 | 5/2003 | Hilton |
| 2005/0138270 A1 | 6/2005 | Morais et al. |

FOREIGN PATENT DOCUMENTS
EP    0999498 A2    10/2000

OTHER PUBLICATIONS

"The Performance Potential of Trace-based Dynamic Optimization," B. Fahs, A. Mahersi, F. Spadini, S. Pate, S. Lumetta; University of Illinois Technical Report; UILU-ENG-04-22081; Nov. 2004; pp. 1-21; http://www.crhc.uiuc.edu/ACS/pub/dynpotential.pdf.
Suganuma, T., et al., "Overview of the IBM Java Just-In-Time Compiler," IBM Systems Journal, vol. 39, No. 1, 2000, 15 pages (http://www.research,ibm.com/journal/sj/391/suganuma.html).
Tang, V., et al., "A Framework for Reducing Instruction Scheduling Overhead In Dynamic Compilers," Proceedings of the 2006 Conference of the Center for Advanced Studies on Collaborative Research, Article 5, 2006, pp. 1-13.
Suganuma, T., et al., "A Dynamic Optimization Framework for a Java Just-In-Time Compiler," ACM SIGPLAN,vol. 36, Issue 11, Nov. 2001, pp. 180-194.
Waldspurger, Carl A., "Memory Resource Management in VMware ESX Server," In Proc. Fifth Symposium on Operant System Design and Implementation (OSDI '02), Dec. 2002, pp. 1-14.

(Continued)

*Primary Examiner* — William M Treat
(74) *Attorney, Agent, or Firm* — John E. Campbell; Blanche E. Schiller, Esq.; Heslin Rothenberg, Farley & Mesiti P.C.

(57) ABSTRACT

A handle for a trace is provided that is memory indifferent. The handle is created using contents of the trace rather than memory location of the trace. This enables the trace to be easily identified in subsequent runs of an application associated with the trace.

19 Claims, 4 Drawing Sheets

OTHER PUBLICATIONS

Rivest, R., "The MD5 Message-Digest Algorithm," Apr. 1992, http://www.ietf.org/rfc/rfc1321.txt, pp. 1-20. z/Architecture Principles of Operation, IBM Publication No. SA22-7832-04, Sep. 2005.

"The Block-based Trace Cache," B. Black, B. Rychlik J. Shen, Department of Electrical and Computer Engineering, Carnegie Mellon University, 1063/6897/99, 1999 IEEE, pp. 196-207.

"Dynamic Phase Analysis for Cycle-Close Trace Generation," C, Pereira, J. Lau, B. Calder, R. Gupta, Department of Computer Science and Engineering, Univeristy of California, San Diego, BNSDOCID: <XP_3101399A_1→, pp. 321-326.

"Dynamic Binary Translation and Optimization in a Whole-System Emulator-SkyEye," C. Yu, R. Jie, Z. Hui, S. Chun, Proceedings of the 2006 Internationa Conference on Parallel Processing Workships (ICPPW'06), 8 pages.

PCT Notification of Transmittal of the International Search Report and the Written Opinion of the International Searching Authority, or the Declaration; PCT/EP2008/050441, Apr. 29, 2008.

Office Action for U.S. Appl. No. 11/625,898 dated Dec. 29, 2008.

Final Office Action for U.S. Appl. No. 11/625,989 dated May 6, 2009.

fig. 1 fig. 2 fig. 3 fig. 4 fig. 5 fig. 6

DEFINING MEMORY INDIFFERENT TRACE HANDLES

CROSS-REFERENCE TO RELATED APPLICATIONS

This application is a continuation of co-pending U.S. patent application Ser. No. 11/625,898, filed Jan. 23, 2007, entitled "DEFINING MEMORY INDIFFERENT TRACE HANDLES", the entirety of which is hereby incorporated herein by reference.

BACKGROUND

This invention relates, in general, to tracing performed within a processing environment, and in particular, to defining handles for the traces produced by the tracing.

When tracing is performed in a processing environment, one or more traces are produced. Each trace includes one or more consecutively executed instructions. The instructions included in the trace are those executed between a start and stop time of the tracing function.

There are different types of tracing techniques, including symbol/module based techniques and trace-based techniques. Trace-based techniques are defined independently of program module boundaries, in contrast to symbol/module based techniques. Sequences produced by trace-based techniques offer important advantages over traditional symbol/module based strategies, since the true program flow is inherently represented in the sequence of instructions. With trace-based techniques, the scope of an optimizer is extended to provide more global opportunities.

Although traces are helpful in providing optimizations for processing environments, there is an inherent difficulty in creating distinct identification handles for traces. Typically, to create handles used to identify traces, information regarding memory location is used. This is problematic, however, when memory location is dynamic.

BRIEF SUMMARY

Based on the foregoing, a need exists for an enhanced capability to identify a trace. In particular, a need exists for a capability to create a handle that identifies a trace regardless of where in memory the trace resides.

The shortcomings of the prior art are overcome and additional advantages are provided through the provision of a computer program product for defining a handle for a trace of a processing environment. The computer program product includes, for instance, a tangible computer readable storage medium readable by a processor and storing instructions for execution by the processor for performing a method. The method includes, for instance, obtaining at least a portion of the trace; and generating a key based on contents of the trace, wherein the key is a handle for the trace, the handle being indifferent to memory location of the trace.

Methods and systems relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

In accordance with an aspect of the present invention, a capability is provided for defining trace handles that are memory indifferent. In particular, a trace handle is defined for a trace that does not depend on the location in memory in which the trace resides. Instead, the handle is based on contents of the trace. This enables the handle to be successfully used across multiple runs of an application for which the trace is defined.

As one example, the application is an emulator. The emulator includes a tracing function (e.g., a recording routine) that traces the instructions being emulated. It is initially turned on when the emulator is started and is turned off at a predetermined point, such as a branch. The set of instructions executed during that time is referred to as a trace. At the branch, another trace may be started to collect another set of instructions, etc. One or more traces are provided during execution of the emulator. The sequence of instructions of a trace may include instructions across different code boundaries, such as across user applications and the operating system, as well as across code that communicates with the application being traced.

Figure 1:
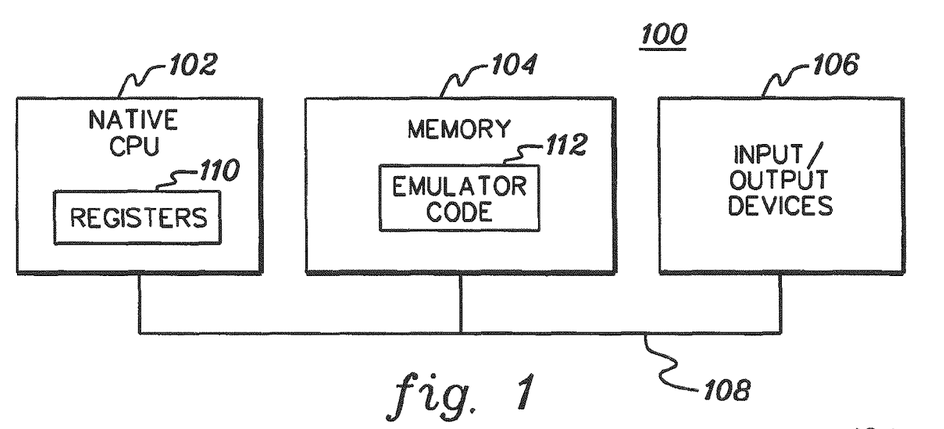
FIG. 1 depicts one embodiment of a processing environment to incorporate and use one or more aspects of the present invention.

One embodiment of a processing environment to incorporate and use one or more aspects of the present invention is described with reference to FIG. 1. In this example, a processing environment 100 is based on one architecture, which may be referred to as a native architecture, but emulates another architecture, which may be referred to as a guest architecture. As examples, the native architecture is the Power4 or PowerPC® architecture offered by International Business Machines Corporation, Armonk, N.Y., or an Intel® architecture offered by Intel Corporation; and the guest architecture is the z/Architecture® also offered by International Business Machines Corporation, Armonk, N.Y. Aspects of the z/Architecture® are described in "z/Architecture Principles of Operation," IBM Publication No. SA22-7832-04, September 2005, which is hereby incorporated herein by reference in its entirety.

Processing environment 100 includes, for instance, a native processor 102 (e.g., a central processing unit (CPU)), a memory 104 (e.g., main memory) and one or more input/output (I/O) devices 106 coupled to one another via, for example, one or more buses 108. As examples, processor 102 is a part of a pSeries® server offered by International Business Machines Corporation (IBM®), Armonk, N.Y. IBM®, pSeries® Power PC®, and z/Architecture® are registered trademarks of International Business Machines Corporation, Armonk, N.Y., U.S.A. Intel® is a registered trademark of Intel Corporation. Other names used herein may be registered trademarks, trademarks or product names of International Business Machines Corporation or other companies.

Native central processing unit 102 includes one or more native registers 110, such as one or more general purpose registers and/or one or more special purpose registers, used during processing within the environment. These registers include information that represent the state of the environment at any particular point in time.

Moreover, native central processing unit 102 executes instructions and code that are stored in memory 104. In one particular example, the central processing unit executes emulator code 112 stored in memory 104. This code enables the processing environment configured in one architecture to emulate another architecture. For instance, emulator code 112 allows machines based on architectures other than the z/Architecture®, such as pSeries® servers, to emulate the z/Architecture® and to execute software and instructions developed based on the z/Architecture.

Figure 2:
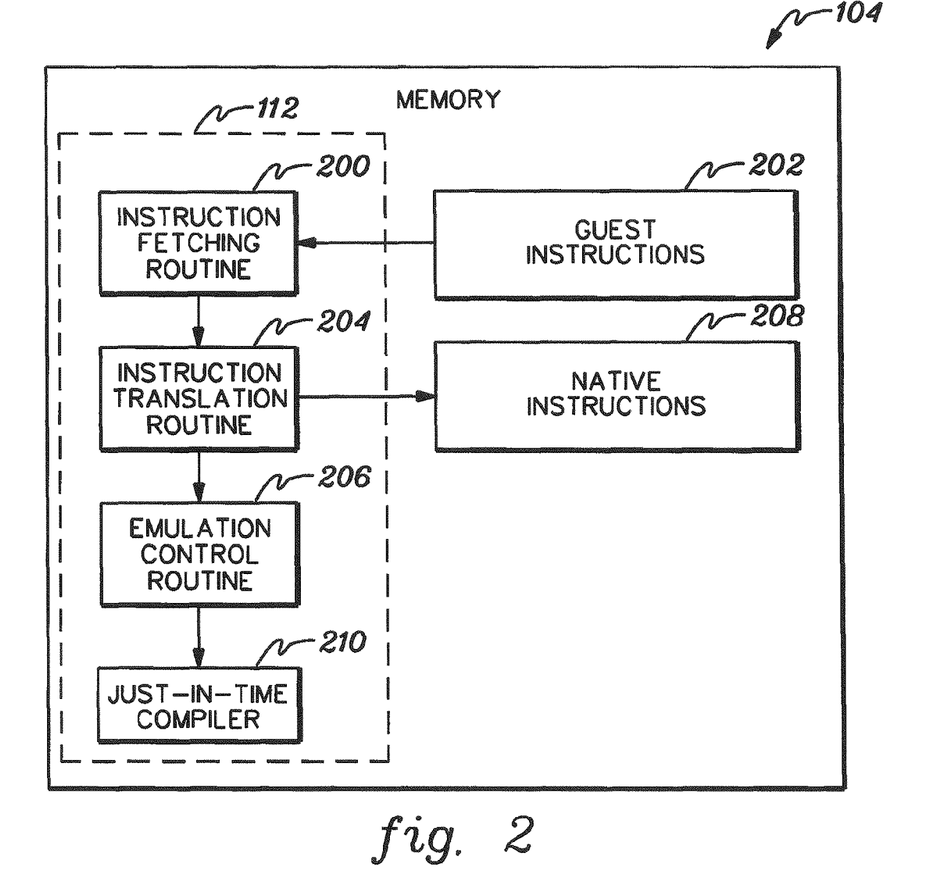
FIG. 2 depicts further details of one embodiment of the memory of FIG. 1, in accordance with one or more aspects of the present invention.

Further details relating to emulator code 112 (a.k.a., emulator) are described with reference to FIG. 2. In one example, emulator code 112 includes an instruction fetching routine 200 to obtain one or more guest instructions 202 from memory 104, and to optionally provide local buffering for the one or more obtained instructions. Guest instructions 202 comprise software instructions (e.g., machine instructions) that were developed to be executed in an architecture other than that of native CPU 102. For example, guest instructions 202 may have been designed to execute on a z/Architecture® processor, but are instead being emulated on native CPU 102, which may be, for instance, a pSeries® server.

Emulator 112 also includes an instruction translation routine 204 to determine the type of guest instruction that has been obtained and to translate the guest instruction into one or more corresponding native instructions 208. This translation includes, for instance, identifying the function to be performed by the guest instruction and choosing the native instructions to perform that function.

Further, emulator 112 includes an emulation control routine 206 to cause the native instructions to be executed. Emulation control routine 206 may cause native CPU 102 to execute a routine of native instructions that emulate one or more previously obtained guest instructions and, at the conclusion of such execution, to return control to the instruction fetching routine to emulate the obtaining of the next guest instruction or guest instructions. Execution of native instructions 208 may include loading data into a register from memory 104; storing data back to memory from a register; or performing some type of arithmetic or logical operation, as determined by the translation routine.

Each routine is, for instance, implemented in software, which is stored in memory and executed by native central processing unit 102. In other examples, one or more of the routines or operations are implemented in firmware, hardware, software or some combination thereof. The registers of the emulated guest processor may be emulated using registers 110 of the native CPU or by using locations in memory 104. In one or more embodiments, guest instructions 202, native instructions 208, and emulation code 112 may reside in the same memory or may be dispersed among different memory devices.

An accumulation of instructions that have been processed by the fetch and control routines is further provided, in one embodiment, to a Just-In-Time compiler 210. The Just-In-Time compiler is a dynamic compiler that examines the instructions, looks for opportunities to remove redundancies and generates a matching sequence of instructions on the native platform on which the emulator is running. While the emulator has visibility to one instruction at a time, the Just-In-Time compiler has visibility to a sequence of instructions. Since it has visibility to a sequence of instructions, it can attempt to look for redundancies in the sequence of instructions and remove them. One example of a Just-In-Time compiler is the JAVA™ Just-in-Time (JIT) compiler offered by International Business Machines Corporation, Armonk, N.Y. JAVA is a trademark of Sun Microsystems, Inc., Santa Clara, Calif.

An overview of the JAVA JIT compiler is described in "Overview of the IBM Just-in-Time Compiler," T. Suganuma et al., Volume 39, Number 1, 2000, http://www.research.ibm.com/journal/sj/391/suganuma.html, which is hereby incorporated herein by reference in its entirety. Aspects of a JIT compiler are also described in, for instance, "A Framework For Reducing Instruction Scheduling Overhead In Dynamic Compilers," V. Tang, J. Siu, A. Vasilevskiy, M. Mitran, Proceedings of the 2006 Conference of the Center for Advanced Studies on Collaborative research, Article 5, 2006; "A Dynamic Optimization Framework For A Java Just-In-Time Compiler," T. Suganuma, T. Yasue, M. Kawahito, H. Komatsu and T. Nakatani, ACM SIGPLAN, Volume 36, Issue 11, November 2001; and "Memory Resource Management in VMware ESX Server," C. A. Waldspurger, In Proc. Fifth Symposium on Operating Systems Design and Implementation (OSDI '02), December 2002, each of which is hereby incorporated herein by reference in its entirety.

The Just-In-Time compiler also includes a capability for providing memory indifferent trace handles for traces provided by the emulator. For instance, the emulator employs a recording routine to track a set of consecutively executed instructions. This set of instructions (i.e., a trace) is forwarded to the Just-In-Time compiler, and the Just-In-Time compiler creates a handle for the trace. This handle is based on the content of the trace, rather than memory location. This feature of the Just-In-Time compiler is described with reference to FIG. 3.

Figure 3:
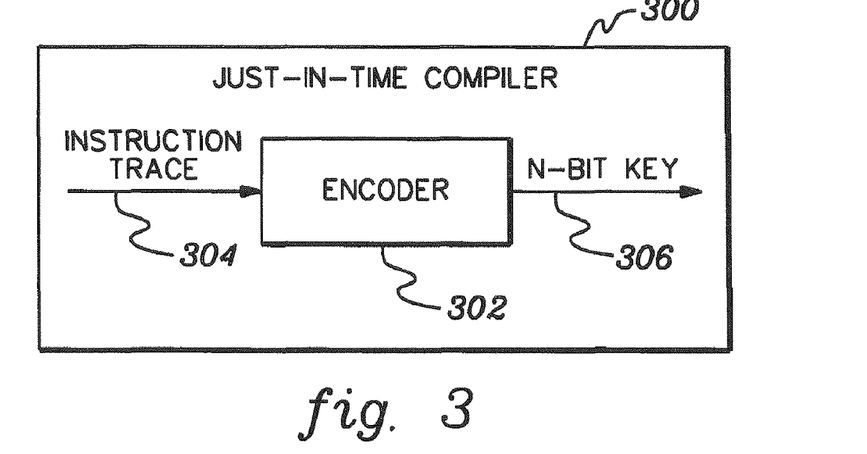
FIG. 3 depicts further details of one embodiment of a Just-In-Time compiler of the emulator of FIG. 2, in accordance with an aspect of the present invention.

Referring to FIG. 3, a Just-In-Time compiler 300 includes an encoder 302, such as a hash encoder, that obtains (e.g., receives, has, fetches, is provided, etc.) an instruction trace 304 as input and provides as output an n-bit key 306. The key is, for instance, a 128 bit hash code that is used as a handle for the trace. This handle is based on contents of the instruction trace and is not dependent on the location in memory of the trace. Therefore, the trace handle is memory indifferent.

Figure 4:
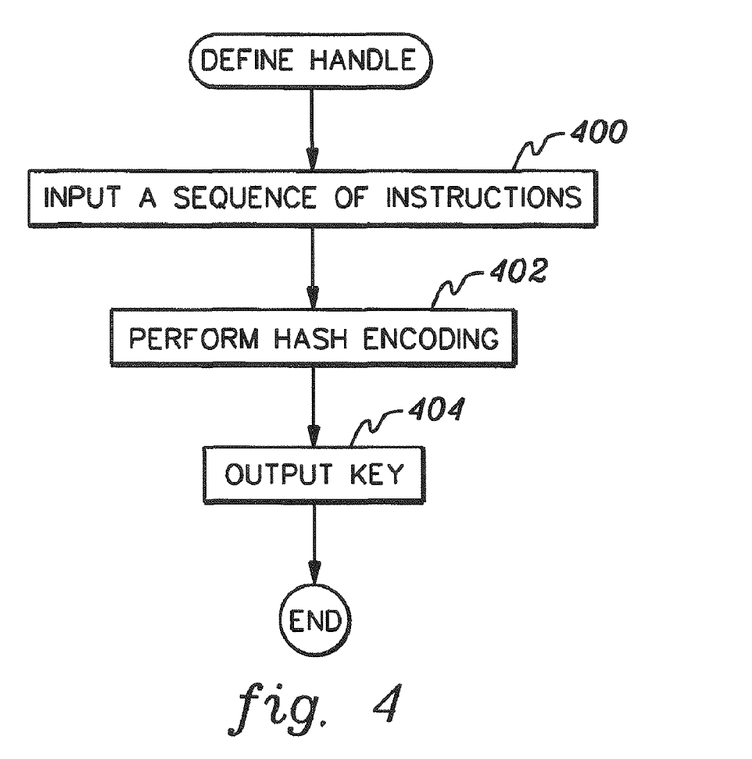
FIG. 4 depicts one embodiment of the logic associated with defining a trace handle, in accordance with an aspect of the present invention.

Further details regarding creating a trace handle are described with reference to FIG. 4. In one embodiment, tracing is initiated within a processing environment (e.g., the emulator is traced) and a trace is produced, which includes a sequence of instructions. The sequence of instructions (i.e., the trace or a portion thereof, in another embodiment) is input to the encoder, STEP 400. The encoder performs, in this example, a hash encoding on the input trace, STEP 402. In one example, the hash code function that is used is MD5, an embodiment of which is described in "The MD5 Message-Digest Algorithm," R. Rivest, April 1992, http://www.ietf.org/rfc/rfc1221.txt., which is hereby incorporated herein by reference in its entirety. Although MD5 is provided as an example, many other hash techniques may be employed. The choice of the hash technique determines the probability that two distinct traces end up with the same key. However, with an algorithm such as MD5, this probability is asymptomatically small, and therefore, this capability is usable in a dynamic compiler, such as JIT.

The output of the hash encoding is a key, STEP 404. In this particular embodiment, the key is a 128-bit hash code that is the identifier (i.e., handle) for the trace. Although in this example, the handle includes 128 bits, in other embodiments, the handle can be other lengths.

The key that is created and used as the trace handle is not based on memory location, but instead, based on trace content. For instance, the encoder selects one or more bits of each instruction (or selected instructions) of the trace and encodes those selected bits producing the n-bit key, which is used as the handle. Since the handle is not based on memory location, the handle identifies with the same trace, regardless of where in memory the trace resides, and across multiple runs of the application.

The trace handle that is created is employed, in one example, to observe the trace during subsequent runs of the application (e.g., emulator). For instance, assume a particular instance of a trace, my_T, is to be observed. The trace is encoded to create a handle my_h_t. Thereafter, the application is re-run one or more times producing one or more traces. Handles are created for those traces and a search is performed of those handles to find a match to my_h_t. The matched handle identifies the specific trace. This is described in further detail with reference to FIG. 5.

Figure 5:
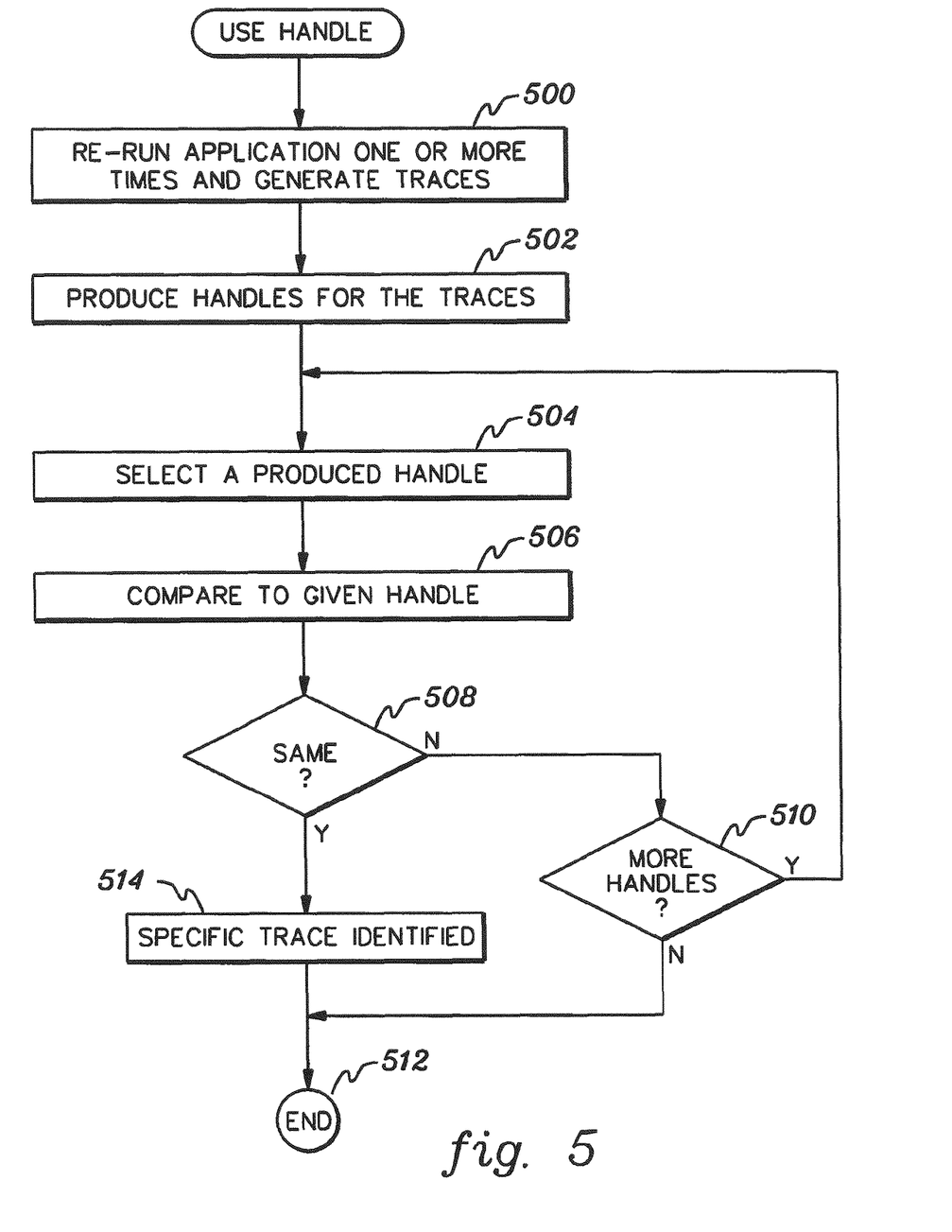
FIG. 5 depicts one embodiment of the logic associated with using a trace handle, in accordance with an aspect of the present invention.

With reference to FIG. 5, it is assumed that the emulator, in this example, has been re-started one or more times. For instance, the emulator is started, one or more traces are produced and then a problem is detected. Thereafter, the emulator is restarted. This may occur one or more times, producing one or more traces for each run of the emulator (e.g., T0, T1, T2), STEP 500. Each trace is encoded to produce a handle for each trace, STEP 502. For instance, the emulator code uses a hash function H to encode each trace, yielding, for instance:

$$H(T0) = h\_t0$$
$$H(T1) = h\_t1$$
$$...$$
$$H(Tn) = h\_tn.$$

The emulator is instructed to provide an observable handle on traces identified by my_h_t, in this example. For instance, it is thought that the sequence of instructions identified by my_h_t is causing a problem or is of interest. Thus, that trace is to be located. Since the memory location of that trace is unknown, a search of the trace is performed. To perform the search, the handle of the trace is used, instead of the instructions of the trace.

In one example, in performing the search, a handle produced during the one or more application runs is selected by the JIT, STEP 504, and compared to the given handle (e.g., my_h_t), STEP 506. If the handles are not the same, INQUIRY 508, then a determination is made as to whether there are additional handles to be compared, INQUIRY 510. If so, then processing continues with STEP 504 "Select a Produced Handle." However, if there are no more handles to be compared, then processing ends, STEP 512.

Returning to INQUIRY 508, if the comparison yields a match, then the specific trace of interest is identified, STEP 514. Once the sequence is found, it can be used in whatever manner is desired. For instance, JITing of that trace can be disabled, optimization can be enabled on the trace, etc. The options are unlimited.

Described in detail above is a capability for defining and using memory indifferent trace handles. As one example, the hash encoding capability transforms a sequence of consecutively executed instructions, called a trace, into a n-bit wide handle. As the encoding does not take into account the memory location of the sequence of instructions, it is memory indifferent. This allows a handle to be defined that is much easier to deal with than the original sequence of instructions. In particular, the initial sequence of instructions that is of interest can be recaptured using the handle, instead of the entire sequence of instructions.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 6:
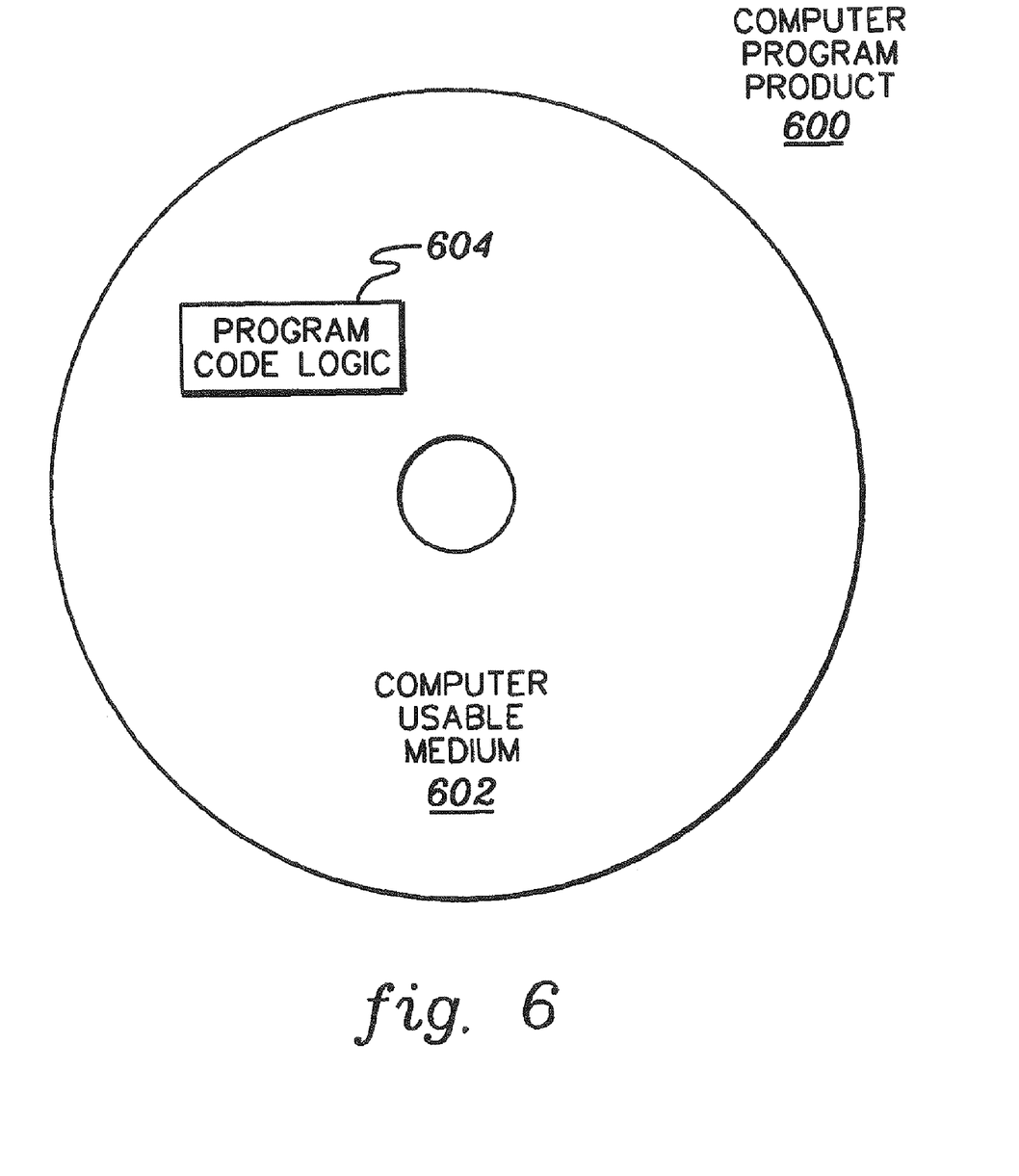
FIG. 6 depicts one embodiment of a computer program product to incorporate one or more aspects of the present invention.

One example of an article of manufacture or a computer program product incorporating one or more aspects of the present invention is described with reference to FIG. 6. A computer program product 600 includes, for instance, one or more computer usable media 602 to store computer readable program code means or logic 604 thereon to provide and facilitate one or more aspects of the present invention. The medium can be an electronic, magnetic, or semiconductor system (or apparatus or device) or an optical device. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability for defining memory indifferent trace handles is provided. This capability enables unique trace handles to be produced irrespective of where in memory the traces reside. An arbitrary length sequence of instructions is represented by a fixed length representation produced via a mapping function. For instance, a sequence that is 1000 instructions long is represented by a 128 bit binary pattern. Thus, when the application is re-run and those 1000 instructions are to be observed, the 128 bit pattern is used to locate the sequence instead of the entirety of the 1000 instructions.

Advantageously, this capability is usable by dynamic compilers, such as JIT, to label traces that span the boundaries of an application. The handles are used to locate the trace in subsequent executions of the application.

Although various embodiments are described above, these are only examples. For instance, the processing environment can include processing units that are based on architectures other than Power4, PowerPC® or Intel®. Additionally, servers other than pSeries® servers can incorporate and use one or more aspects of the present invention. Further, the processing environment can emulate environments other than the z/Architecture®. Additionally, various emulators can be used. Emulators are commercially available and offered by various companies. Yet further, the processing environment need not include emulator code. Many other types of processing environments can incorporate and/or use one or more aspects of the present invention.

Moreover, even though an example of an encoding function is provided, many other encoding techniques, including hash and non-hash functions, may be used. MD5 is provided as only one example.

Additionally, an emulator is only one example of an application. Other types of applications can be traced and trace handles for those traces may be desired. Yet further, the application may be re-started for many reasons or a trace may be observed for many reasons. The examples provided herein are only examples.

Even further, in one or more embodiments, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

As used herein, the term "obtaining" includes, but is not limited to, fetching, receiving, having, providing, being provided, creating, developing, etc.

The capabilities of one or more aspects of the present invention can be implemented in software, firmware, hardware, or some combination thereof At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer program product for defining a handle for a trace of a processing environment, the computer program product comprising:
   a tangible computer readable storage medium readable by a processor and storing instructions for execution by the processor for performing a method, said method comprising:
   obtaining at least a portion of the trace; and
   generating a key based on contents of the trace, wherein the key is a handle for the trace, said handle being indifferent to memory location of the trace.

2. The computer program product of claim 1, wherein the handle identifies the trace across multiple runs of an application associated with the trace regardless of where in memory the trace resides.

3. The computer program product of claim 2, wherein the application comprises an emulator of the processing environment.

4. The computer program product of claim 1, wherein the generating comprises using a hash code function to generate the key.

5. The computer program product of claim 4, wherein the hash code function comprises a hash code function that decreases the probability that multiple distinct traces are identified by a same key.

6. The computer program product of claim 1, wherein the generating comprises employing one or more instructions of the trace to generate the key.

7. The computer program product of claim 1, wherein the generating comprises:
   obtaining by an encoder a sequence of instructions defining the trace; and
   encoding by the encoder at least a portion of one or more instructions of the sequence of instructions to provide the key.

8. The computer program product of claim 1, wherein the generating is performed by a Just-In-Time compiler.

9. The computer program product of claim 1, wherein the method further comprises employing the handle to identify the trace in one or more subsequent runs of an application associated with the trace.

10. The computer program product of claim 9, wherein the application comprises an emulator.

11. The computer program product of claim 10, wherein the emulator runs on one system architecture and emulates another system architecture of the processing environment.

12. The computer program product of claim 9, wherein the employing comprises:
   selecting a generated handle from one or more generated handles produced for one or more traces provided by running the application one or more times; and
   comparing the generated handle to the handle, wherein a match of the generated handle and the handle identifies the trace.

13. A computer system for defining a handle for a trace of a processing environment, the computer system comprising:
   a memory; and
   a processor in communications with the memory, wherein the computer system is capable of performing a method, said method comprising:
   obtaining at least a portion of the trace;
   generating a key based on contents of the trace, wherein the key is a handle for the trace, said handle being indifferent to memory location of the trace, and
   employing the handle to identify the trace in one or more subsequent runs of an application associated with the trace.

14. The computer system of claim 13, wherein the handle identifies the trace across multiple runs of an application associated with the trace regardless of where in memory the trace resides.

15. The computer system of claim 14, wherein the application comprises an emulator of the processing environment.

16. The computer system of claim 13, wherein the generating comprises using a hash code function to generate the key.

17. The computer system of claim 13, wherein the generating comprises employing one or more instructions of the trace to generate the key.

18. The computer system of claim 13, wherein the generating comprises:
   obtaining by an encoder a sequence of instructions defining the trace; and
   encoding by the encoder at least a portion of one or more instructions of the sequence of instructions to provide the key.

19. The computer system of claim 13, wherein the employing comprises:
   selecting a generated handle from one or more generated handles produced for one or more traces provided by running the application one or more times; and
   comparing the generated handle to the handle, wherein a match of the generated handle and the handle identifies the trace.

* * * * *